Dec. 14, 1965 H. F. MICHAEL 3,222,853
GRASS AND LEAF BALER FOR ROTARY LAWN MOWERS
Filed March 30, 1964
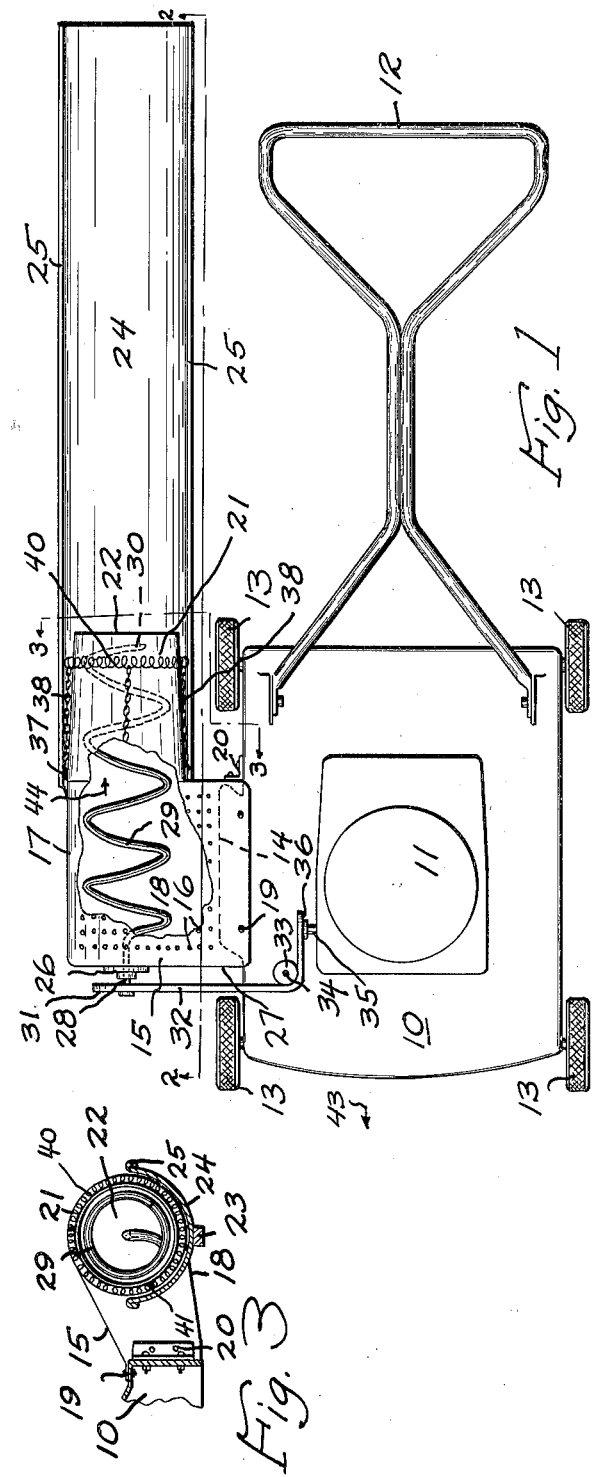
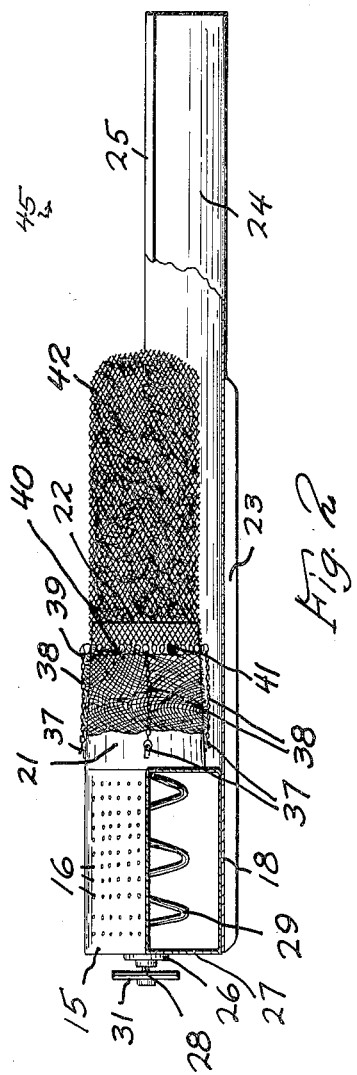
INVENTOR.
Henry F. Michael
BY
Sam J. Slotsky
ATTORNEY

United States Patent Office 3,222,853
Patented Dec. 14, 1965

3,222,853
GRASS AND LEAF BALER FOR
ROTARY LAWN MOWERS
Henry F. Michael, 408 S. Jessica Ave., Sioux Falls, S. Dak.
Filed Mar. 30, 1964, Ser. No. 355,771
2 Claims. (Cl. 56—202)

My invention relates to an attachment for rotary lawn mowers.

An object of my invention is to provide a device which is adaptable to a lawn mower, and wherein the cut grass, leaves, twigs, etc. will be efficiently discharged into disposable sacks, providing bales which can be discarded, thereby providing a convenient means for gathering of the excess matter of this type, eliminating the need for raking and the like.

A further object of my invention is to provide an arrangement of this type wherein successive bales can be quickly and conveniently formed.

A further object of my invention is to provide an efficiently operating device wherein the bales are formed in a positive manner, etc.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

FIGURE 1 is a plan view of the device as attached to a lawn mower,

FIGURE 2 is a sectional view of FIGURE 1 taken substantially along the lines 2—2, and FIGURE 3 is a sectional view taken substantially along the lines 3—3 of FIGURE 1.

My invention contemplates the provision of a device which can be attached to a standard rotary type lawn mower, and wherein during the cutting operation, the grass and other material discharged by the rotating blades will be gathered into bales which can then be discarded or thrown away, thereby combining the functions of cutting and raking, etc. in a simple and single operation.

In describing my invention I have used the character 10 to designate the casing of a rotary lawn mower which is driven by means of the engine 11, the character 12 indicating the handle for pushing the lawn mower, the character 13 indicating the wheels thereof.

The character 14 indicates the usual discharge opening through which the cut material, etc. is thrown, and to this structure I attach my device which comprises a hollow casing having the top wall 15 which wall includes the openings 16, the casing including the arcuate wall portion 17 and a lower wall 18. This casing is attached over the discharge opening 14 by means of screws 19 and the brackets 20, and the casing extends into a tapered cylindrical hollow tube 21 which tapers to the opening 22.

Attached to the casing wall 18 is a support member 23 upon which is secured an arcuate lengthened chute 24 having the bent over edges 25. Suitably journalled within a bracket 26 which is attached to the side wall 27 of the casing is a shaft 28 which is secured to a helical conveyor member 29 which is made of rod-like material, and which is free at its end 30, and attached to the shaft 28 is a pulley 31 which engages the belt 32 which belt passes over a pair of idler pulleys 33 journalled on the vertical shaft 34 which is attached to the mower unit 10, and the character 35 indicates a further shaft suitably driven by the motor 11, which shaft is attached to a further pulley 36 which is engaged with the belt 32.

Attached at 37 to the member 21 are the chains 38 which are attached at 39 to a helical spring 40 which is wound around the member 21 and which includes a connecting arrangement at 41 whereby the ends of the spring can be connected together when desired. The character 42 indicates a disposable sack which can be made of any length desired.

The device operates in the following manner.

The arrangement comprising the portions 21, chute 24, auger 29 etc. can be readily attached to the lawn mower as explained, and it will be understood that any type of drive can be used for driving the auger 29, FIGURE 1 showing a preferred type however. The power take-off from the mower can be adapted to drive by other methods than that shown.

It will now be noted that as the lawn mower is pushed in the direction of the arrow 43, the rotating blades of the mower will throw all of the cut grass, leaves, etc. through the discharge opening 14 and into the casing bounded by the various walls 15, 17, 18, and 27, the openings 16 permitting the air pressure to flow uniformly through these openings to thereby assist in the proper action, and the auger 29 will then convey the grass, leaves, etc. in the direction of the arrow 44 through the member 21 and into the disposable sack or bag member 42. As the sack is filled, the continuously applied pressure from the auger will force the sack to the right as viewed in FIGURE 2 in the direction of the arrow 45 until the sack is completely filled with the material, whereupon the sack can be tied at its inner end and by any type of tying arrangement, and can then be carried away and disposed of.

It will be noted that as the sack 42 travels along the chute 25, it will gradually slip under the spring 40, and yet will be firmly held thereby until the sack is filled. The sack is easily applied by merely disengaging the spring 40 at 41 and thence placing the end of the sack under the end of the member 21 with the closed end of the sack being relatively close to the opening 22 and then the fastener 41 is again refastened, with the above described action taking place. The helical conveyor 29 provides a positive thrust to the material, and yet has the feature of an open core conveyor, being hollow internally, in this way preventing the clogging and damaging of the auger which would be present with the more solid type of auger, and I have found that this type of auger operates efficiently for the purpose intended.

It should also be specifically understood that the sack 42 could be replaced by means of an outer sack made of suitable fabric or the like which would be permanent, and which could include a disposable sack member inside, which disposable member could be discarded whenever desired.

It will be noted from the foregoing description that my invention will provide all of the desirable functions of eliminating the need for raking or picking up loose particles from the lawn and the like, is efficient in operation, can be removed when desired, and will also provide variout other advantages which are readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A grass and leaf catcher including a baler for a rotary lawn mower having a discharge opening, said catcher comprising a unit having a material receiving casing, said casing having a leaf and grass receiving opening therein and being adapted to be attached to said mower so that said casing opening is adjacent said discharge opening, said casing having a plurality of small openings therein for the passage of air, a tapered neck portion integrally connected to and extending from said casing in which grass and leaves are adapted to be compressed after they enter said casing through said discharge opening, the neck portion being open at each end thereof, a rotatable auger member mounted in said casing and extending into said neck portion, said auger member being in the form of a helically wound rod, means to rotate said auger member, an annular coil spring fastening means adapted to releasably fasten a disposable sack on the outer surface of said neck portion so that the sack may receive compressed grass and leaves as they are ejected through the end of said neck portion remote from said mower discharge opening, chain means attached to said neck portion and being adapted to releasably fasten said coilspring to said neck portion, and sack support means integrally connected to and extending from said casing.

2. A grass and leaf catcher including a baler for a rotary lawn mower having a discharge opening, said catcher comprising a unit having a material receiving casing, said casing having a leaf and grass receiving opening therein and being adapted to be attached to said mower so that said casing opening is adjacent said discharge opening, said casing having a plurality of small openings therein for the passage of air, a tapered neck portion integrally connected to and extending from said casing in which grass and leaves are adapted to be compressed after they enter said casing through said discharge opening, the neck portion being open at each end thereof, a rotatable auger member mounted in said casing and extending into said neck portion, said auger member being in the form of a helically wound rod, means to rotate said auger member, fastening means adapted to releasably fasten a disposable sack on the outer surface of said neck portion so that the sack may receive compressed grass and leaves as they are ejected through the end of said neck portion remote from said mower discharge opening, and sack support means integrally connected to and extending from said casing.

References Cited by the Examiner
UNITED STATES PATENTS

| | | |
|---|---|---|
| 377,821 | 2/1888 | Wissler. |
| 3,014,330 | 12/1961 | Oberdick _____ 56—25.4 |
| 3,087,297 | 4/1963 | Chace _____ 56—202 |

FOREIGN PATENTS

| | | |
|---|---|---|
| 963,580 | 1/1950 | France. |
| 342,934 | 2/1931 | Great Britain. |
| 364,334 | 1/1932 | Great Britain. |

WALTER A. SCHEEL, *Primary Examiner.*